United States Patent Office 3,265,750
Patented August 9, 1966

3,265,750
SEPARATION OF OLEFINS FROM PARAFFINS
David W. Peck, Charleston, Robert R. Gentry, St. Albans, and Henry E. Fritz, Charleston, W. Va., assignors to Union Carbide Corporation, a corporation of New York
No Drawing. Filed Mar. 31, 1964, Ser. No. 356,070
10 Claims. (Cl. 260—666)

This invention relates to a method for the separation of olefinic hydrocarbons from saturated hydrocarbons. More particularly, this invention relates to a liquid-phase separation of olefins from paraffins employing molecular sieves.

Although it is well known that molecular sieves can be employed to separate hydrocarbon compounds on the basis of their degree of unsaturation, none of the known methods have been particularly satisfactory for general use. For example, molecular sieves having a pore size of about 5 Angstroms can separate only those streams consisting of straight-chain materials. Moreover, it has been disclosed by Kimberlin et al. in U.S. Patent 2,971,993 that the degree of selectivity based on unsaturation possessed by such sieves decreases with increasing chain length. On the other hand, the use of sieves having larger pore sizes, such as the use of 13X molecular sieves for vapor-phase separations gives poor results. Although some olefin is adsorbed by the sieve and one can obtain small amounts of olefin-free product, a product stream significantly enriched in olefin content cannot be obtained. Moreover, the main effect of the sieve is to isomerize the olefins. Finally, Milton has indicated in U.S. Patents 3,078,636 and 3,078,644 that the separating ability of the sieves is lost when the hydrocarbon stream is liquid.

It has been discovered by this invention, however, that when hydrocarbon fractions are contacted in the liquid phase with a molecular sieve having a pore size sufficiently large to adsorb benzene, a highly efficient and practical process is obtained. Unexpectedly and surprisingly, in addition to permitting good separations at commercially feasible rates, little or no isomerization of olefins results.

The molecular sieves employed in the process of this invention are those well known to those skilled in the art, and are those at least partially dehydrated molecular sieves having substantially uniform pore sizes sufficiently large to adsorb benzene, generally at least about 7 Angstroms in diameter. As examples of sieves of this type, one can mention the zeolite X type sieve as disclosed and claimed in U.S. Patent 2,882,244 to Milton having pore sizes in the range of about 8 to about 10 Angstroms, the zeolite Y type sieve as disclosed in U.S. Patent No. 3,130,007, issued April 21, 1964, and the zeolite L type sieve as disclosed in U.S. application Serial No. 122,398 filed June 7, 1961, by D. W. Breck and N. A. Acara, and now abandoned. If desired, the molecular sieves may be treated by various methods to inhibit polymerization, such as treatment with an amine as disclosed in Belgian Patent 608,439. However, such treatments ordinarily are unnecessary when conducting a liquid-phase separation in accordance with this invention.

The feed employed in the process of this invention can be any hydrocarbon fraction containing at least two components, one of which has a higher degree of olefinic unsaturation than the other. For example, the feed can consist of n-olefins and n-paraffins, branched olefins and branched paraffins, cyclo-olefins and cycloparaffins, alkenyl aromatic compounds and alkylaromatic compounds, as well as mixtures of one or more of the foregoing classes, and the like.

The process of this invention is especially suitable for separating hydrocarbons of three different classes. The first class comprises hydrocarbons containing olefinic double bonds which are not desirably isomerized, for example, an alpha-olefin of from 4 to 20 carbon atoms or a diolefin. The second class comprises acylic hydrocarbons of from about 10 to about 20 carbon atoms, and the third class comprises hydrocarbons of up to about 20 carbons containing at least one cyclic moiety, i.e., alicyclic compounds and compounds containing an aromatic ring, both of which cannot be readily separated by the known processes.

The temperature at which the process of this invention is conducted is not highly critical, provided the separation is effected under conditions at which the feed is liquid. Thus, temperatures of from about 10° C. or lower up to the boiling point of the liquid being separated under the conditions of the separation are readily employed. As the temperature is increased, however, the degree of selectivity is adversely affected somewhat, and, accordingly, temperatures below about 100° C. are preferred, with temperatures of about room temperature (20 to 25° C.) being particularly preferred.

The pressure under which the process of this invention is conducted is not highly critical and atmospheric, sub-atmospheric and super-atmospheric pressures may be employed. Because no advantage is obtained with higher or lower pressures, atmospheric pressure is generally employed.

The adsorption is effected by any technique known to those skilled in the art. Thus, the fraction to be separated can be fed to the top or the bottom of the sieve bed and an effluent consisting of olefin-free material recovered. When olefin-breakthrough becomes apparent, or exceeds the desired level, the feed to the bed is stopped and the desorption cycle is begun. Instead of stationary beds, one can employ moving beds or fluid beds of molecular sieves. In addition, several beds may be employed in parallel to provide for a substantially continuous overall operation.

Desorption of the sieve bed may be effected by any of several techniques. For example, one can drain the bed of unadsorbed hydrocarbons and then wash the bed with a highly polar material, such as water, ethers, alcohols and the like. A preferred technique comprises flushing the bed with a low boiling liquid paraffin, then flushing with a low boiling olefin and then again with a low boiling paraffin. In each case the low boiling material should have a normal boiling point at least 30° C. below that of the hydrocarbon being separated to permit easy separation by distillation. Preferred materials are olefins or paraffins of from 4 to about 7 carbons, such as butene, butane, pentene, pentane, heptene, heptane, and the like. The first paraffin wash removes unadsorbed hydrocarbon from the sieve bed, and the low boiling olefinic compound is employed to desorb the olefins from the sieve which are then washed from the bed with the low boiling paraffin. The use of low boiling materials for this purpose, particularly for the first paraffin wash, is considered unusual in view of the disclosure of C. J. Egan in U.S. 3,054,838 that low molecular weight materials are more strongly adsorbed in the liquid phase than high molecular weight materials on 5A type sieves.

The sieve bed is reactivated by known methods, such as heating to elevated temperatures or subjecting it to low pressures. Reactivation is ordinarily unnecessary when the preferred technique outlined above is employed to free the bed of adsorbed olefins. However, after several cycles, it may be necessary to heat the bed to remove the polymers and other adsorbed material.

The following examples are illustrative. In the examples, the conditions are room temperature and pressure unless otherwise specified.

*Example 1*

An 80-gram sample of n-undecane containing 5 weight percent $C_{11}$ random n-olefins (i.e., a mixture of n-undecene isomers) was charged to the top of a column packed with 200 grams of 12–30 mesh 13X molecular sieve manufactured by the Linde Division of Union Carbide Corporation. Then pentane was charged to the sieve to wash unadsorbed hydrocarbons from the bed, which were recovered in two fractions. After evaporation of the pentane, each fraction was weighed and analyzed for olefin content by bromine addition. The first fraction weighed 64 grams and contained less than 0.1% olefin and the second fraction weighed 9 grams and contained only 1% olefin. Butene-1 was then charged to the column to free adsorbed olefins and then pentane was charged to the column to wash the desorbed olefins from the bed. After evaporation of the pentane, there were recovered 4 grams of 91% n-undecenes.

*Example 2*

A 150-gram portion of 15% n-dodecene-1 in n-dodecane was charged to the top of a column containing 400 grams of 12–30 mesh 13X molecular sieve. The sieve was then charged with 500 milliliters of pentane to remove the n-dodecane and flushed with 1-butene vapors to free adsorbed 1-dodecene. The freed 1-dodecene was washed from the sieve with pentane and the effluent was evaporated to recover 15 grams of 99% 1-dodecene. The sieve bed was then charged with a second 150-gram portion of the dodecane-dodecene mixture and there were recovered 13 grams of 96% 1-dodecene in the manner described above. This procedure was repeated two additional times to obtain 15 grams of 99% 1-dodecene and 14 grams of 97% 1-dodecene.

*Example 3*

A mixture of straight chain $C_{10}$–$C_{15}$ paraffins and random olefins containing 9.3% olefins was pumped upward through a 1-inch by 52-inch glass column packed with 412 grams of 12–30 mesh 13X molecular sieve at a rate of 1,160 milliliters per hour and the effluent was collected in 20-milliliter fractions. The first 340 milliliters (260 grams) contained less than 0.2% olefin. Olefin breakthrough then became significant and pumping of the olefin-paraffin mixture was continued until the olefin content of the effluent was equal to that of the feed, at which point the total volume pumped was 1,500 milliliters. The column was then drained and 500 milliliters of pentane were poured down through the sieve to wash off unadsorbed paraffin. A 400-milliliter portion of ethyl ether was charged to the column to free adsorbed olefin from the sieve. After evaporation of the ether from the effluent, there were recovered 24 grams of 99% olefins.

*Example 4*

A solution of 10 grams of $C_{11}$–$C_{18}$ alpha-n-olefins in 90 grams of $C_{10}$–$C_{16}$ n-paraffins was charged to the top of a 35-millimeter diameter column packed with 450 grams of 13X molecular sieve powder which had been treated to exchange the normally present sodium ions by potassium ions. Pentane was then added to the top of the bed to wash out unadsorbed hydrocarbons and the resultant effluent was taken in three fractions from which the pentane was distilled. Then methanol was added to the top of the sieve to elute the adsorbed olefin and the methanolic effluent was distilled to remove methanol. Each of the four fractions thus obtained was analyzed by bromine addition, and the percent olefin in each cut was calculated based on an average molecular weight of 200 for the mixed olefin. The results of the analyses of the four fractions are set forth in tabular form below:

| Cut No. | Weight | Bromine Addition, Meq./gm. | Percent Olefin |
|---|---|---|---|
| 1 | 70 | 0.02 | 0.2 |
| 2 | 12 | 0.45 | 4.5 |
| 3 | 3 | 4.78 | 48 |
| 4 | 4.3 | 10.20 | 100 |

*Example 5*

Employing apparatus and procedure similar to those described in Example 4, a 200-gram sample of $C_{10}$–$C_{15}$ n-paraffins and random n-olefins containing 9% olefins was charged to the top of a column containing 400 grams of potassium-exchanged 13X molecular sieve powder. Pentane was added to elute the paraffins, which were recovered in four fractions, and then methanol was added to elute the olefins. After distillation of the solvents from the five fractions, the fractions were analyzed by bromine addition, and the olefin content of each was calculated based on an average molecular weight of 168 for the olefins. The results of these analyses are set forth in tabular form below:

| Cut No. | Wt. Grams | Percent Olefin |
|---|---|---|
| 1 | 112 | nil |
| 2 | 43 | 3.6 |
| 3 | 28 | 11.3 |
| 4 | 5 | 31 |
| 5 | 6 | 94 |

*Example 6*

Employing apparatus and procedures similar to those described in Example 4, 100 grams of the olefin-paraffin mixture employed in Example 5 was charged to the top of a column containing 300 grams of potassium-exchanged 13X molecular sieve and the bed was flushed with pentane. A total of 88 grams of paraffin containing no olefins was obtained, followed by 4.5 grams containing 10% olefins. Butene-1 was then passed down through the sieve bed to desorb the olefins, which were then washed from the sieve with pentane. On evaporation of the pentane from the effluent there were obtained 6.8 grams of 91% olefins.

*Example 7*

Employing apparatus and procedures similar to those described in Example 4, 500 grams of the olefin-paraffin mixture employed in Example 5 were charged to the top of a column containing 350 grams of potassium-exchanged 13X sieve. There were recovered from the bottom of the column 228 grams of paraffin containing 0.1% olefins. Pentane was charged to the column to wash out unadsorbed paraffin and olefin. The last 5 grams of the hydrocarbon eluted by the pentane was combined with 10 grams of olefins freed by flooding the sieve with butene-1 followed by washing the sieve with pentane. The combined product contained 94% olefins.

*Example 8*

An 80-gram sample of 10% 1-dodecene in n-dodecane was charged to the top of a 1-inch I.D. column packed with 200 grams of 12–30 mesh potassium-exchanged 13X molecular sieve. The hydrocarbon was eluted with 460 milliliters of pentane, the effluent was collected in fractions and the pentane was distilled off. There were recovered 46 grams of n-dodecane containing 0.1% 1-dodecene and 27 grams of an olefin-paraffin mixture containing 15% 1-dodecene. The sieve bed was flushed with butene-1, then pentane, and, after evaporation of solvent from the effluent, there were obtained 4 grams of 97% 1-dodecene.

The sieve was reactivated by subjection to reduced pressure (12 millimeters absolute) to remove residual butene-1 and pentane. The reactivated sieve was then employed to separate a 40-gram sample of the dodecene-dodecane mixture and then reactivated in the manner described above. The sieve was again charged with a 40-gram sample of the dodecene-dodecane mixture and eluted with 200 milliliters of pentane to give 33 grams of n-dodecane containing 0.5% 1-dodecene and 3 grams containing 18% olefins. On treatment of the sieve with butene-1 and then pentane there were recovered 4 grams of 83% 1-dodecene.

Example 9

A total of 400 grams of 12% 1-dodecene in n-dodecane was charged to the top of a column containing 220 grams of 12–30 mesh 13X molecular sieve, which had been treated with silver nitrate solution to exchange the sodium ions for silver ions and activated by heating at 500° C. The first 127 grams of effluent from the column contained no 1-dodecene as determined by vapor phase chromatography. After the sieve was drained, it was washed with 600 milliliters of pentane. The column was then washed with butene-1 and then pentane to obtain 20 grams of 98% 1-dodecene.

Example 10

Employing procedures similar to those described in Example 9, a 400-gram sample of 10% n-dodecene in n-dodecane was fed to a bed of 200 grams of 10X powdered molecular sieve. There were recovered 125 grams of 99.7% n-dodecane and 6.5 grams of 94% n-dodecene.

Example 11

A 46-gram mixture of 21% cyclodedecene and 78% cyclododecane was dissolved in 54 grams of pentane and fed to a bed containing 200 grams of 12–30 mesh 13X molecular sieve. The bed was then flushed with pentane and, after evaporation of the pentane, there were recovered 31 grams of 97% cyclododecane. The bed was then flushed with butene-1 vapors followered by a pentane wash. After evaporation of butene and pentane from the resultant effluent, there were recovered 7 grams of 70% cyclododecene.

Example 12

A mixture of 25 grams of styrene and 100 grams of ethylbenzene was fed to a bed containing 400 grams of 12–30 mesh 13X molecular sieve. The bed was flushed with 700 milliliters of pentane to recover, after evaporation of the pentane, 30 grams of ethylbenzene containing no styrene as determined by vapor phase chromatography. The bed was then washed with 400 milliliters of benzene followed by 300 milliliters of pentane to recover, after evaporation of benzene and pentane, 42 grams of 77 percent ethylbenzene. Finally, the bed was washed with ethyl ether to remove adsorbed styrene and, after evaporation of ethyl ether from the effluent, there were recovered 11 grams of 89 percent styrene.

Example 13

A mixture of 13.5 percent 1-decene and 86.5 percent n-decane was continuously fed to the top of a column packed with 200 grams of potassium-exchanged 12–30 mesh 13X molecular sieve which was heated at 200° C. to maintain the feed in the vapor phase. The first 13 grams of effluent consisted of decane containing no decene, and the next 8 grams consisted of 98.6 percent decane. The olefin content of the effluent then increased rapidly to approach the feed composition, and, after 187 grams had been fed to the column, the feed was terminated. The column was drained, heated to 250° C. and washed with 300 milliliters of pentane. The resulting effluent was recovered in two fractions which, after removal of pentane, weighed 18 grams and 4 grams, respectively, and contained 84 percent and 77 percent decane, respectively, as determined by bromine number. The decene present in these fractions had partly isomerized to internal decenes as determined by infrared analysis. The column was cooled to room temperature and washed with 700 milliliters of ethyl ether to recover adsorbed decene. The adsorbate, after evaporation of the ether, weighed 7 grams and contained only 44 percent of mixed n-decene isomers.

A comparison of this example with Example 3 illustrates the necessity for conducting the separation of $C_{10}$ and higher aliphatic hydrocarbons in the liquid phase. Thus, although olefin-free paraffin could be recovered with vapor-phase operation, the amount of 99% paraffin was only 0.1 gram per gram of sieve bed, whereas the amount of 99.8+% paraffin recovered in Example 3 was over 0.63 gram per gram of sieve bed. Similarly, in this example only 0.035 gram of 44% olefin per gram of sieve bed was recovered, whereas 0.057 gram of 99 percent olefin was recovered per gram of sieve bed in Example 3.

Example 14

A 400-gram mixture of 10% 1-dodecene in n-decane was fed to a bed of 400 grams of 14–30 mesh 5A molecular sieve. The first 26 grams of effluent were only 95% dodecane. After draining unabsorbed liquid, the bed was flushed with 400 milliliters of ethylbenzene and then 400 milliliters of 1-hexadecene to desorb the dodecene. The resulting effluent contained dodecene and dodecane in approximately the same ratio as the feed.

Example 15

A 200-gram mixture of 10% n-dodecene in n-dodecane was charged to a column of 200 grams of 5A molecular sieve. The first 100 grams of effluent were 92.3 percent dodecane. After washing the bed with one liter of benzene to remove non-adsorbed $C_{12}$ hydrocarbons, the bed was washed with one liter of pentane to displace adsorbed dodecene. After evaporation of pentane from the resulting effluent there were recoverd only 2.5 grams of 11.8% olefins.

These last two examples illustrate that small-pore size sieves, such as a 5A sieve, will not effectively separate long-chain olefins and paraffins in the liquid phase. Although a slightly enriched paraffin effluent can be recovered, it is recovered in substantially smaller quantities than when a larger-pore size sieve is employed. For example, only 0.065 gram of 95% dodecane was recovered per gram of 5A sieve in Example 14, whereas over 0.57 gram of 100% dodecane was recovered per gram of 13X sieve in Example 9 and over 0.62 gram of 99.7% dodecane was recovered per gram of 10X sieve in Example 10. Moreover, the olefin adsorbate, which in Examples 9 and 10 was 94 to 98 percent olefin, was not significantly different from the feed composition in Examples 14 and 15.

What is claimed is:

1. The method for separating an olefinically-unsaturated hydrocarbon from a mixture containing said unsaturated hydrocarbon and a more saturated hydrocarbon which comprises the steps of (1) contacting said mixture in the liquid phase with a bed of an at least partially dehydrated molecular sieve having a substantially uniform pore size of dimensions sufficient to permit benzene to pass into the pores thereof, (2) thereafter contacting said sieve containing adsorbed olefinically-unsaturated hydrocarbon with a paraffin having a boiling point at least 30° C. below that of the unadsorbed hydrocarbon to remove unadsorbed hydrocarbons from said bed, and (3) desorbing the adsorbed hydrocarbon from said sieve bed by contacting said sieve bed with a polar liquid.

2. The process as claimed in claim 1 wherein said olefinically-unsaturated hydrocarbon is an α-olefin of from 4 to 20 carbons, inclusive.

3. The process as claimed in claim 1 wherein said olefinically-unsaturated hydrocarbon and said more saturated hydrocarbon each contain at least one cyclic moiety and contain not more than 20 carbons.

4. The process as claimed in claim 1 wherein said olefinically-unsaturated hydrocarbon is styrene and said more saturated hydrocarbon is ethylbenzene.

5. The process as claimed in claim 1 wherein said olefinically-unsaturated and more saturated hydrocarbons are acyclic hydrocarbons of from 10 to 20 carbons, inclusive.

6. The method for separating an olefinically-unsaturated hydrocarbon from a mixture containing said unsaturated hydrocarbon and a more saturated hydrocarbon which comprises the steps of (1) contacting said mixture in the liquid phase with a bed of an at least partially dehydrated molecular sieve having a substantially uniform pore size of dimensions sufficient to permit benzene to pass into the pores thereof, (2) flushing the bed with a paraffin having a boiling point at least 30° C. below that of said mixture to remove unadsorbed hydrocarbons, (3) contacting said sieve containing adsorbed olefinically-unsaturated hydrocarbon with an olefin having a boiling point at least 30° C. below that of the adsorbed hydrocarbon, (4) and thereafter flushing said bed with a paraffin having a boiling point at least 30° C. below that of said olefinic hydrocarbon to remove said olefinic hydrocarbon and said olefin.

7. The process as claimed in claim 6 wherein said olefinically-unsaturated hydrocarbon is an α-olefin of from 4 to 20 carbons, inclusive.

8. The process as claimed in claim 6 wherein said olefinically-unsaturated hydrocarbon and said more saturated hydrocarbon each contain at least one cyclic moiety and contain not more than 20 carbons.

9. The process as claimed in claim 6 wherein said olefinically-unsaturated hydrocarbon is styrene and said more saturated hydrocarbon is ethylbenzene.

10. The process as claimed in claim 6 wherein said olefinically-unsaturated and more saturated hydrocarbons are acyclic hydrocarbons of from 10 to 20 carbons, inclusive.

References Cited by the Examiner

UNITED STATES PATENTS

| | | | |
|---|---|---|---|
| 2,882,243 | 4/1959 | Milton | 260—676 |
| 2,971,993 | 2/1961 | Kimberlin et al. | 260—676 |
| 2,988,503 | 6/1961 | Milton et al. | 260—666 |
| 3,054,838 | 9/1962 | Egan | 260—676 |
| 3,094,483 | 6/1963 | Hengstebeck | 260—676 |
| 3,182,017 | 5/1965 | Fleck et al. | 260—666 |
| 3,207,803 | 9/1965 | Davis | 260—676 |

DELBERT E. GANTZ, *Primary Examiner.*

V. O'KEEFE, *Assistant Examiner.*